United States Patent
Mueller et al.

(10) Patent No.: US 9,016,749 B2
(45) Date of Patent: Apr. 28, 2015

(54) COLLAPSIBLE REAR SEAT STORAGE ASSEMBLY

(71) Applicant: Ford Global Technologies, LLC, Dearborn, MI (US)

(72) Inventors: Peter T. Mueller, Farmington Hills, MI (US); Richard J. Soyka, Jr., Shelby Twp., MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/034,719

(22) Filed: Sep. 24, 2013

(65) Prior Publication Data

US 2015/0084360 A1    Mar. 26, 2015

(51) Int. Cl.
*B60R 7/04*    (2006.01)
*B60R 5/00*    (2006.01)

(52) U.S. Cl.
CPC . *B60R 5/006* (2013.01); *B60R 7/04* (2013.01); *B60R 7/043* (2013.01)

(58) Field of Classification Search
CPC .................................. B60R 7/04; B60R 7/043
USPC ............ 296/37.14, 37.15; 297/188.08–188.1
See application file for complete search history.

(56) References Cited

U.S. PATENT DOCUMENTS

| | | | |
|---|---|---|---|
| 5,957,521 A * | 9/1999 | Schlachter ................. | 296/37.15 |
| 6,015,071 A * | 1/2000 | Adomeit et al. ........... | 224/42.34 |
| 6,053,553 A | 4/2000 | Hespelt | |
| 6,056,177 A | 5/2000 | Schneider | |
| 6,074,000 A | 6/2000 | Wagner | |
| 6,106,044 A | 8/2000 | Schlachter | |
| 6,161,896 A * | 12/2000 | Johnson et al. ............ | 297/188.1 |
| 6,290,277 B1 * | 9/2001 | Spykerman et al. ....... | 296/24.43 |
| 6,390,547 B1 * | 5/2002 | Spykerman ................ | 297/188.1 |
| 6,419,313 B1 * | 7/2002 | Newman .................... | 297/188.1 |
| 6,520,364 B2 | 2/2003 | Spykerman et al. | |
| 6,626,478 B1 | 9/2003 | Mlnton | |
| 6,824,029 B2 * | 11/2004 | Tuel et al. ..................... | 224/275 |
| 6,837,531 B2 * | 1/2005 | Mack et al. ................ | 296/65.09 |
| 7,121,606 B2 * | 10/2006 | Khan et al. ................. | 296/37.15 |
| 7,300,088 B1 * | 11/2007 | Catenacci et al. ......... | 296/37.15 |
| 7,341,301 B1 * | 3/2008 | Schambre et al. ......... | 296/37.15 |
| 7,597,372 B2 * | 10/2009 | Nagamoto et al. ......... | 296/37.14 |
| 7,677,655 B2 * | 3/2010 | Marsh .......................... | 297/129 |
| 7,780,229 B2 | 8/2010 | Verhee | |
| 8,770,661 B2 * | 7/2014 | Kalergis et al. ............ | 297/188.1 |

(Continued)

FOREIGN PATENT DOCUMENTS

WO    2006020974    2/2006

OTHER PUBLICATIONS

Chrysler Town & Country Dealer Brochure, http://www.chrysler.com/en/pdf/2010_town_country.pdf, Printed Sep. 20, 2013.

*Primary Examiner* — Gregory Blankenship
(74) *Attorney, Agent, or Firm* — Vichit Chea; Price Heneveld LLP

(57) ABSTRACT

An underseat storage assembly for a vehicle seat includes a recess disposed on a floor below the vehicle seat. A front panel has an edge pivotally coupled with the floor and first and second side panels are pivotally coupled with opposing ends of the front panel. The front panel is movable between a stored position within the recess and a deployed position and has the first and second side panels vertically arranged and orthogonal to the front panel.

20 Claims, 11 Drawing Sheets

(56) References Cited

U.S. PATENT DOCUMENTS

| | | |
|---|---|---|
| 2002/0070574 A1* | 6/2002 | Carlsson et al. ........... 296/37.14 |
| 2004/0134946 A1* | 7/2004 | Gammon ...................... 224/275 |
| 2006/0099057 A1 | 5/2006 | Fair |
| 2010/0270821 A1* | 10/2010 | Ulita .......................... 296/37.14 |
| 2013/0038080 A1 | 2/2013 | Tate, Jr. |
| 2013/0313869 A1* | 11/2013 | Aguirre et al. ........... 297/188.09 |
| 2014/0001798 A1* | 1/2014 | Kalergis et al. .......... 297/188.08 |

* cited by examiner

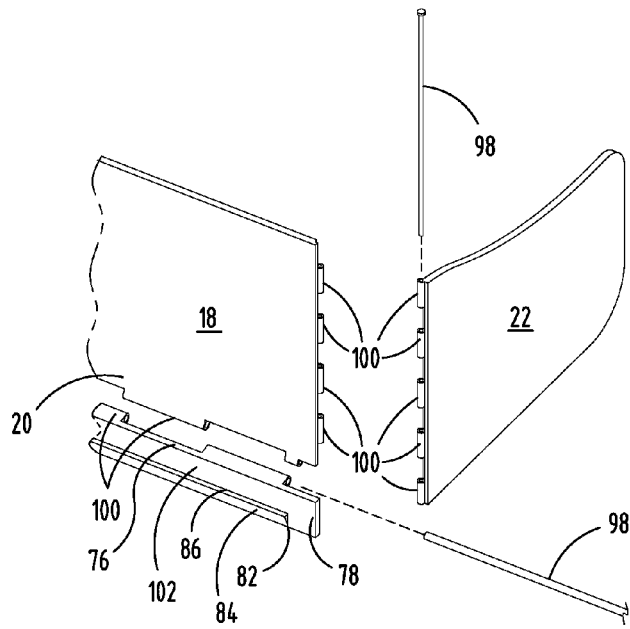
FIG. 9
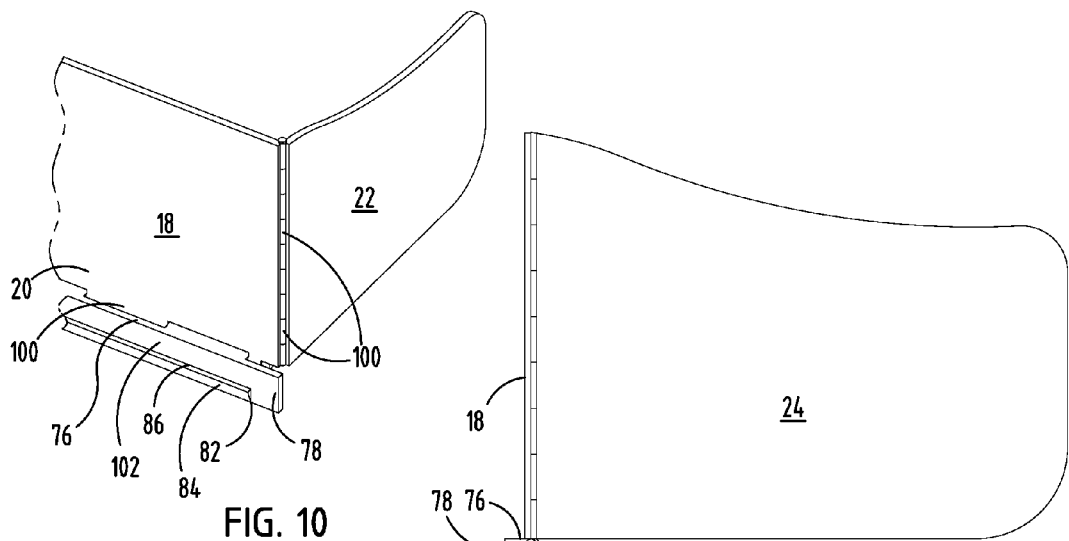
FIG. 10
FIG. 11

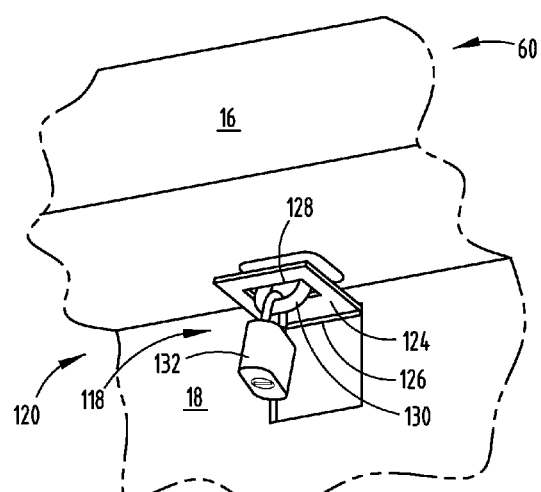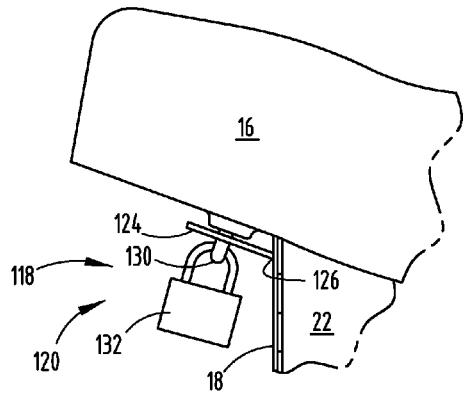
FIG. 16  FIG. 16A
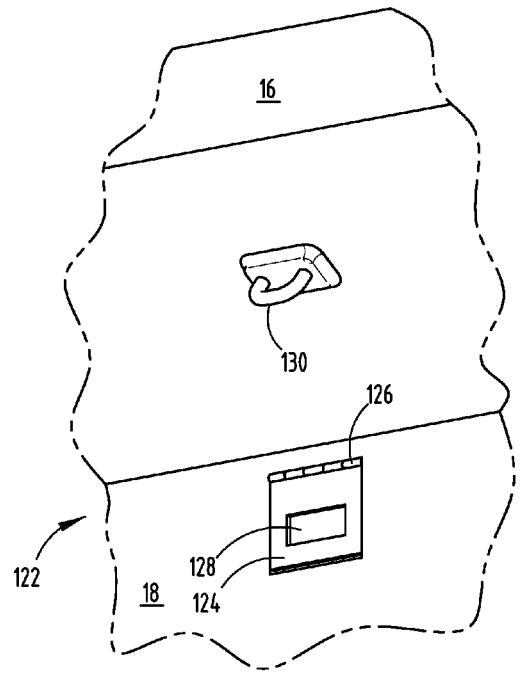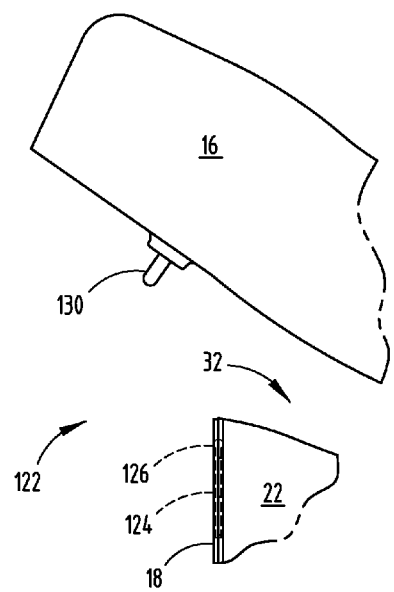
FIG. 17  FIG. 17A

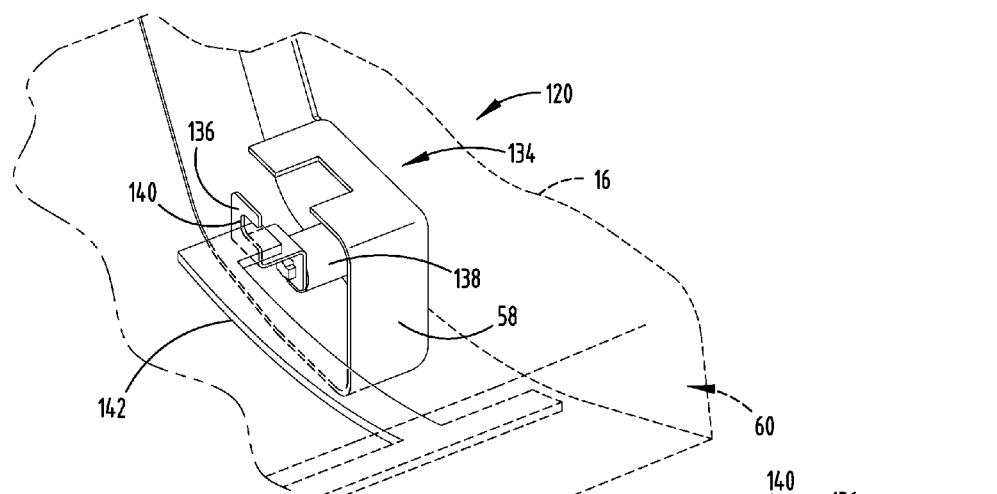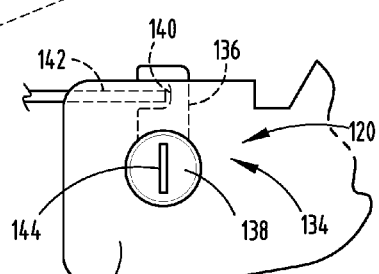
FIG. 18
FIG. 18A
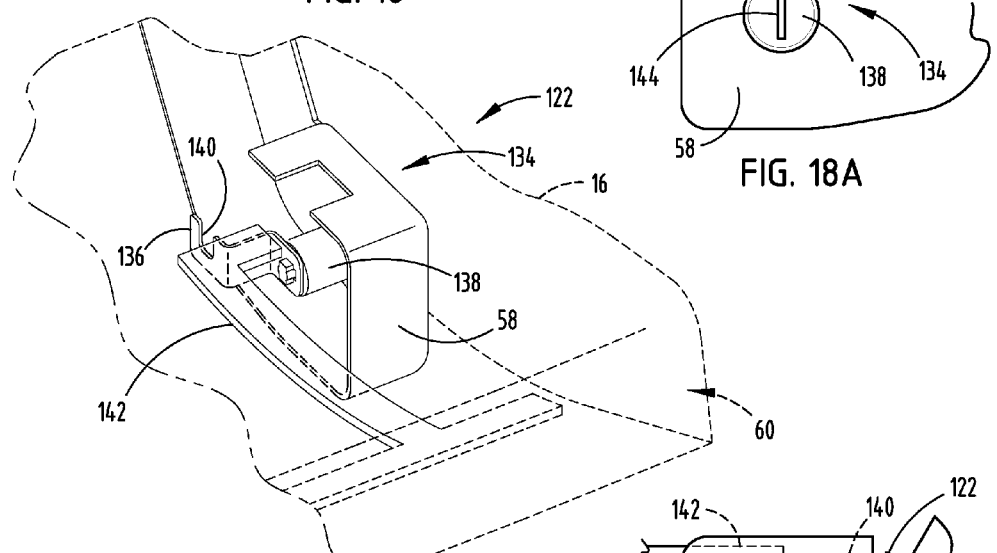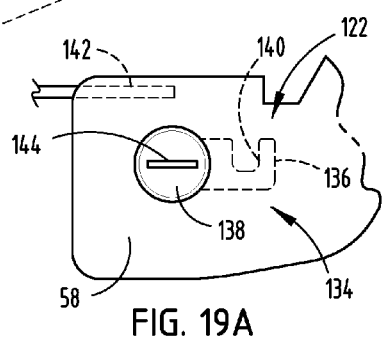
FIG. 19
FIG. 19A

US 9,016,749 B2

COLLAPSIBLE REAR SEAT STORAGE ASSEMBLY

CROSS-REFERENCE TO RELATED APPLICATION

This application is related to U.S. patent application Ser. No. 13/537,262, entitled "CONFIGURABLE UNDERSEAT STORAGE FEATURE," filed on Jun. 29, 2012, the entire disclosure of which is hereby incorporated herein by reference.

FIELD OF THE INVENTION

The present invention generally relates to an underseat storage assembly for a vehicle, and more particularly, to a collapsible underseat storage assembly for a vehicle seat.

BACKGROUND OF THE INVENTION

It is generally understood that the interior cabins of vehicles may include various storage compartments and areas. For example, drawers have been configured for the underseat area of vehicle seats and netting has been configured for storage across the rearward facing surface of seatback. However, it is common for these storage compartments to be limited to the storage of small items or, if otherwise capable of storing large items, the compartments generally encompass a large volume of the interior cabin and are typically restrictive to the available space for occupants or other uses of the interior cabin.

SUMMARY OF THE INVENTION

According to one aspect of the present invention, an underseat storage assembly for a vehicle seat includes a recess disposed on a floor below the vehicle seat. A front panel has an edge pivotally coupled with the floor and first and second side panels are pivotally coupled with opposing ends of the front panel. The front panel is movable between a stored position within the recess and a deployed position and has the first and second side panels vertically arranged and orthogonal to the front panel.

According to another aspect of the present invention, an underseat storage assembly for a vehicle includes a floor below a seat, a recess in the floor, and a panel assembly pivotally coupled with the floor. The panel assembly includes a front panel and first and second side panels pivotally coupled with opposing ends of the front panel. The panel assembly is pivotal between a stored position within the recess and a deployed position to define a storage volume.

According to another aspect of the present invention, a vehicular underseat storage assembly includes a floor below a seat, a recess in the floor, a front panel pivotally coupled with the floor and movable between a stored position within the recess and a deployed position orthogonal to the floor. First and second side panels are pivotally coupled with opposing ends of the front panel and movable orthogonal to the front panel in the deployed position to define a storage volume.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 9 is an exploded top perspective view of a corner portion of the underseat storage assembly;

FIG. 10 is a top perspective view of the assembled corner portion shown in FIG. 9;

FIG. 11 is a cross-sectional side view of a front panel and first and second side panels exploded away from a floor of the vehicle, according to one embodiment of the present invention;

FIG. 12A is a top perspective view of the underseat storage assembly, as shown in FIG. 12;

FIG. 12B is a top plan view of the underseat storage assembly, as shown in FIG. 12;

FIG. 16 is a bottom perspective view of a portion of the seating assembly shown in FIG. 2 with a first embodiment of a locking feature coupled between the front panel in the deployed position and the first seat in the downward horizontal position;

FIG. 16A is a side elevational view of the locking feature, as shown in FIG. 16;

FIG. 17 is a bottom perspective view of the of the first embodiment locking feature disengaged and the first seat pivoting upward from the lowered horizontal position;

FIG. 17A is a side elevational view of the locking feature, as shown in FIG. 17;

FIG. 18 is a top perspective view of a portion of the seating assembly shown in FIG. 2 with a second embodiment of a locking feature that is coupled between the first seat and a riser bracket that pivotally supports the first seat;

FIG. 18A is a side elevational view of the locking feature, as shown in FIG. 18;

FIG. 19 is a top perspective view of the second embodiment of the locking feature disengaged from the first seat; and FIG. 19A is a side elevational view of the locking feature, as shown in FIG. 19.

DETAILED DESCRIPTION OF THE PREFERRED EMBODIMENTS

Figure 1:
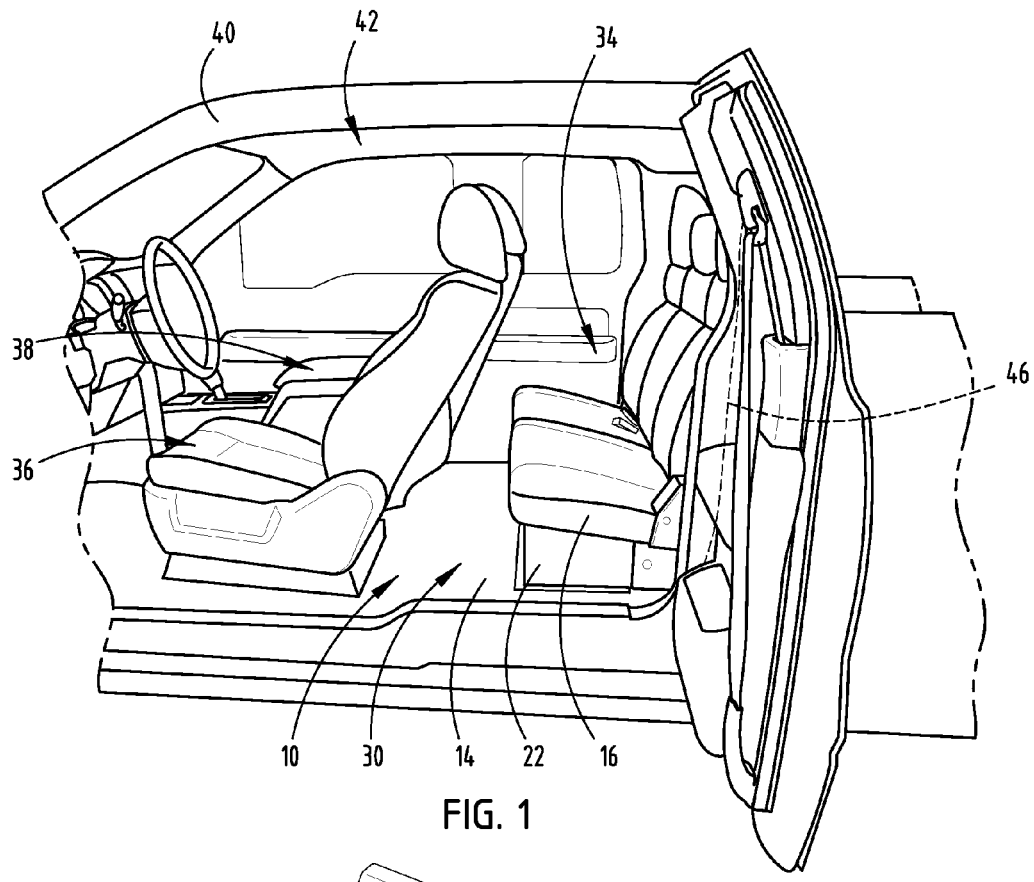
FIG. 1 is a side top perspective view of a vehicle having an underseat storage assembly arranged below a seating assembly, according to one embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-19A, reference numeral 10 generally designates an underseat storage assembly that has a recess 12 disposed in a floor 14 below a vehicle seat 16. A front panel 18 has a bottom edge 20 that is pivotally coupled with the floor 14. A first side panel 22 and a second side panel 24 are pivotally coupled with opposing ends 26 of the front panel 18. The front panel 18 is moveable between a stored position 28 within the recess 12 and a deployed position 30 to define a storage volume 32.

Referring now to the embodiment illustrated in FIG. 1, the underseat storage assembly 10 is shown in the deployed position 30 arranged generally below the seat 16 of a seating assembly 34. The seating assembly 34 in the illustrated embodiment is located rearward from the front driver seat 36 and passenger seat 38 of a vehicle 40. More specifically, the seating assembly 34 is shown as a rear bench seat of a truck 40 that spans laterally across an interior cabin 42 of the vehicle 40 between opposing side doors 44 and is attached along a rear wall 46 of the interior cabin 42. It is contemplated that the underseat storage assembly 10 may be arranged below alternative types of seating assemblies, including elevated bucket seats, and may be positioned below seating assemblies that may be found at alternative locations within the vehicle 40, including a mid-row location or a front seat location. It is also understood that the underseat storage assembly 10 may be incorporated in other vehicle types, such as a sedan, an SUV, a van, or other vehicles as generally understood by one having ordinary skill in the art.

Figure 2:
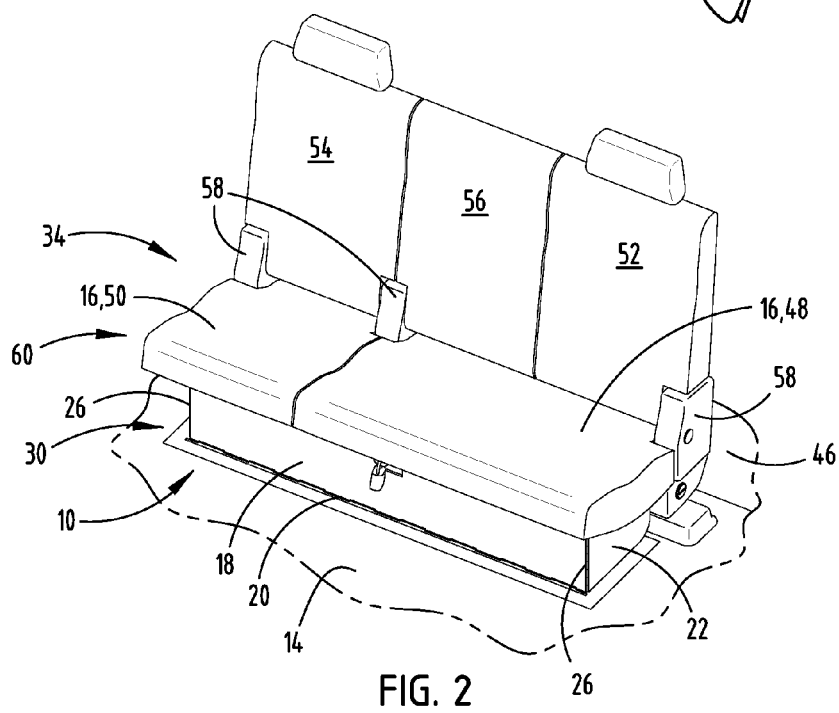
FIG. 2 is a top perspective view of the seating assembly having the underseat storage assembly shown in a deployed position.

As illustrated in FIG. 2, the seat 16 of the seating assembly 34 includes a first seat 48 and a second seat 50 that are each separately coupled with the rear wall 46 of the vehicle 40 at the rearward corners of the seats. The seating assembly 34 also includes a first seat back 52 and a second seat back 54 positioned above the respective first seat 48 and second seat 50. The first seat and first seat back 48, 52 are sized with the length that is approximately 60% of the overall lateral length of the seating assembly 34. Accordingly, the second seat and second seat 50, 54 back occupy approximately 40% of the overall lateral length of the vehicle seating assembly 34. As such, the first seat and seat back 48, 52 include a middle seat portion 56 on the inboard side of the first seat and seat back 48, 52 that is configured to accommodate a third passenger. The middle seat portion 56 may conceivably be separate from the first seat and seat back 48, 52 in other embodiments to have an individual seat and/or seat back. The rearward corners of the first and second seats 48, 50 are each supported by and pivotally coupled with a riser bracket 58 that rigidly extends forward from the rear wall 46 of the vehicle 40. However, it is contemplated that the riser brackets 58 may additionally or alternatively couple with the floor 14 of the vehicle 40 and extend upward to couple with the seats proximate the rear wall 46. The illustrated riser brackets 58 also support a lower portion of the first and second seat back 52, 54, and may conceivably pivotally couple with the seat backs to provide a reclining function. It is also understood that the second seat and seat back 50, 54 may be combined with the first seat and seat back 48, 52 or the seating assembly 34 may be otherwise divided into more seats or alternatively arranged to have spacing between the seats or seat backs.

Figure 3:
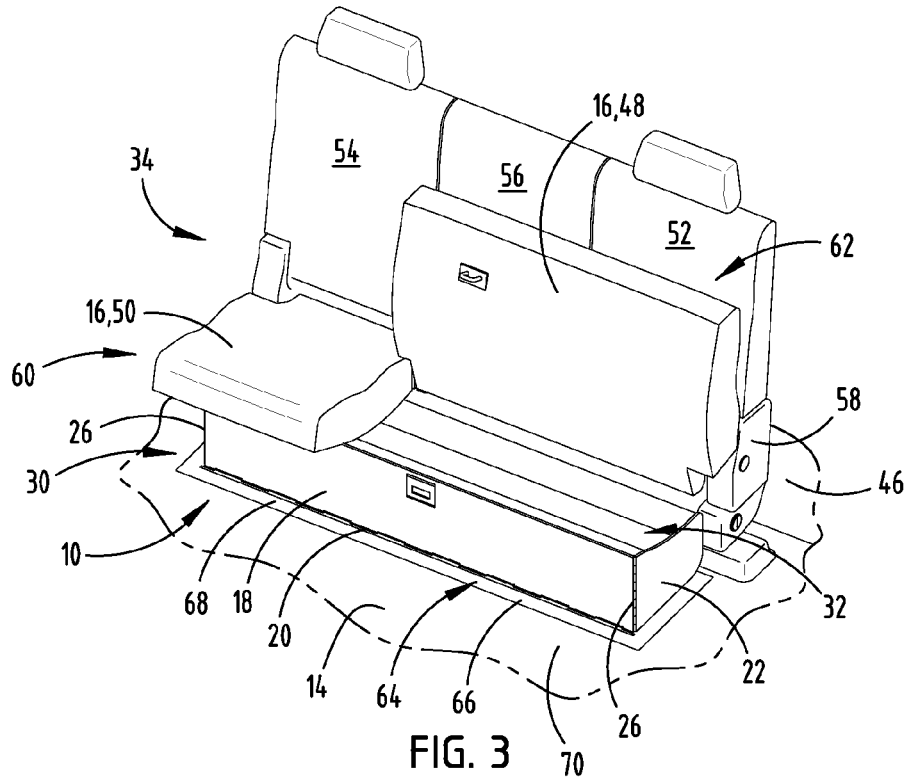
FIG. 3 is a top perspective view of the seating assembly having a first seat in a raised vertical position.
Figure 4:
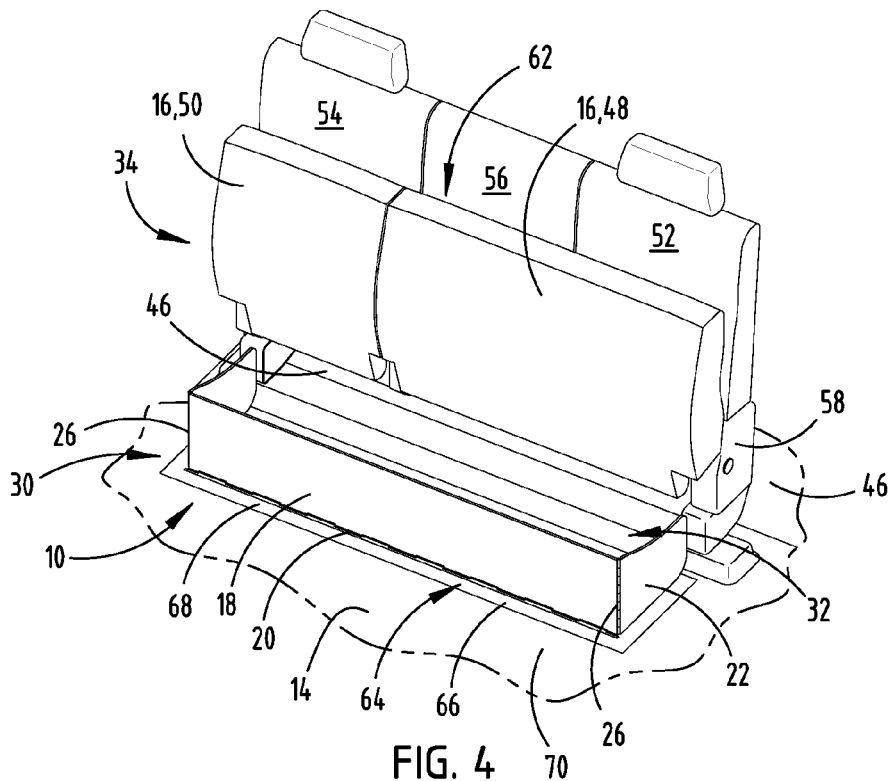
FIG. 4 is a top perspective view of the vehicle seating assembly having the first seat and a second seat in the raised vertical position.

As shown in FIGS. 3-4, the first and second seats 48, 50 may be pivotally raised about the riser brackets 58 from a generally horizontal position 60 (FIG. 2) to a generally vertical position 62 (FIG. 4). As shown in FIG. 3, the first seat 48 is raised to the generally vertical position 62, exposing the storage volume 32 of the underseat storage assembly 10. More specifically, when the first seat 48 is raised, the storage volume 32 may be accessed immediately below the first seat 48 and may also provide some visual access to the storage volume 32 beneath the second seat 50. It is contemplated that the first or second seat 48, 50 may be raised to the vertical position 62 to access the storage volume 32 in situations where only a portion of the storage volume may be necessary, such as for items that may rest in the storage volume 32 but also extend vertically out of the storage volume 32. Furthermore, the first and second seats 48, 50 may be held upright in the vertical position 62 with pneumatic actuators, locked in the vertical position 62 with lock mechanisms, or otherwise supported in the vertical position 62, such that a user may access or manipulate the underseat storage assembly 10 without having to support the first or second seat 48, 50 in the upright position.

As further illustrated in FIG. 4, the first and second seats 48, 50 are shown in the raised vertical position 62, whereby the entire storage volume 32 of the underseat storage assembly 10 may be accessed. The storage volume 32 is defined by the front panel 18, the rear wall 46 of the vehicle 40 (FIG. 1), and the first and second side panels 22, 24 being upright and extending longitudinally between the front panel 18 and the rear wall 46 at opposing ends 26 of the front panel 18. The floor 14 of the vehicle 40 surrounding the underseat storage assembly 10 has a base member 64 that couples with the front panel 18 and spans between the first and second side panels 22, 24. A peripheral edge 66 of the base member 64 has a generally planar surface 68 that is in flush alignment with a carpeted area 70 of the floor 14 that generally surrounds the base member 64. Although it is common for interior floors of a vehicle to be carpeted, it is understood that the carpeted area 70 may be a polymer or rubber liner or may be cover with a rubber floor mat. It is also conceivable that the base member 64 may be alternatively shaped or otherwise integrated with the vehicle floor 14.

Figure 5:
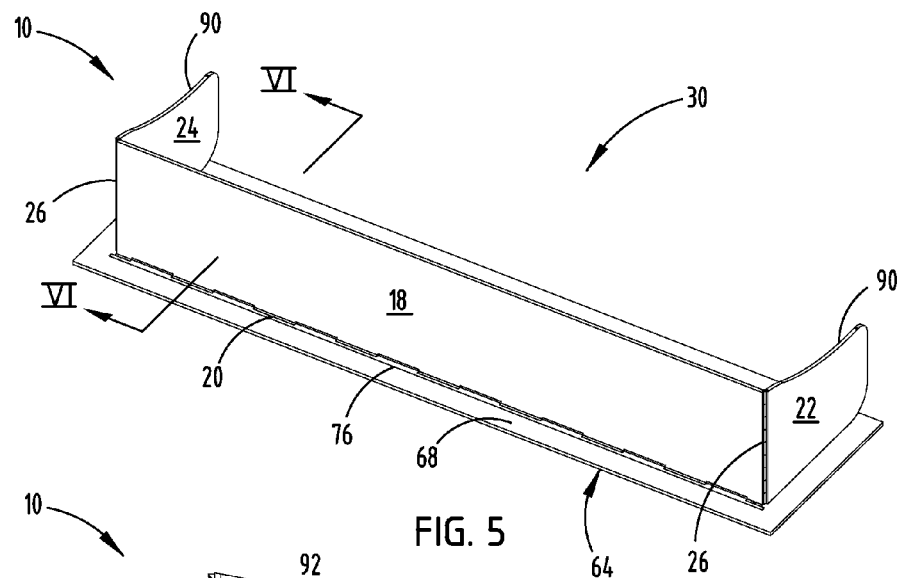
FIG. 5 is a top perspective view of the underseat storage assembly in the deployed position.
Figure 6:
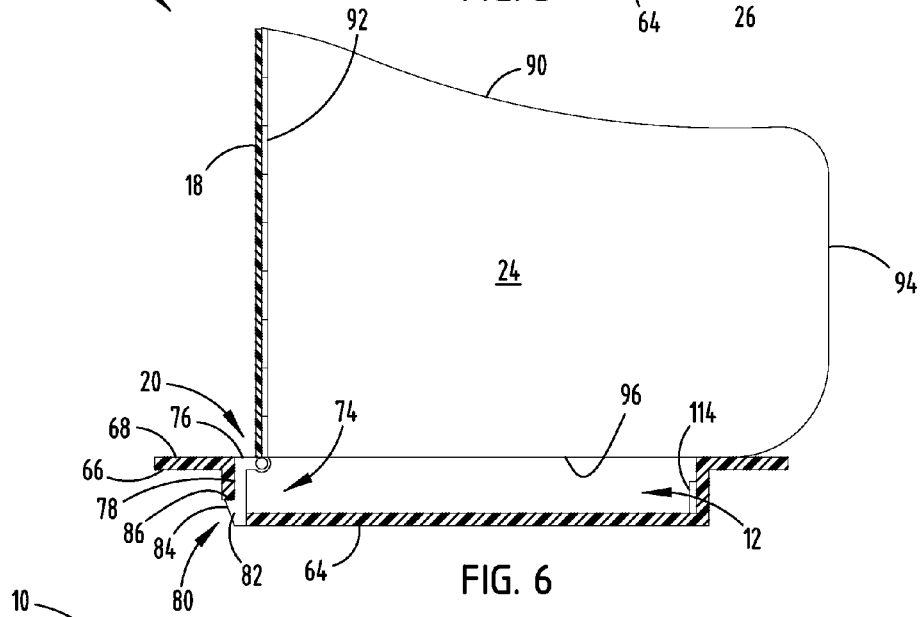
FIG. 6 is a cross-sectional side view of the underseat storage assembly, taken at line VI-VI of FIG. 5.
Figure 7:
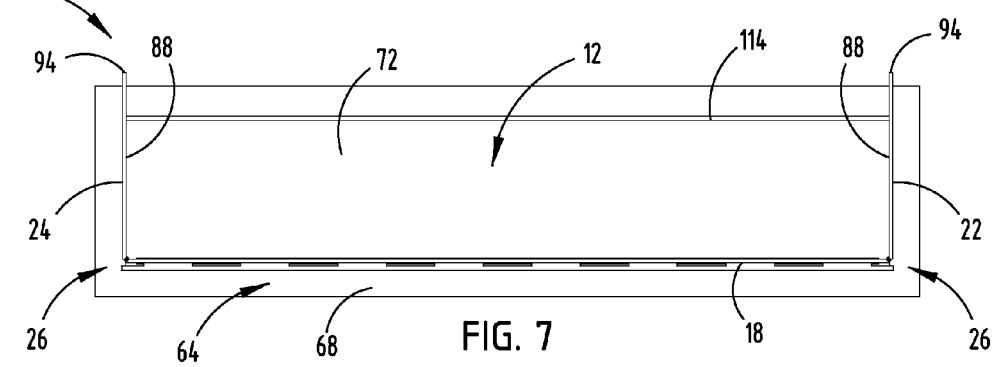
FIG. 7 is a top plan view of the underseat storage assembly in the deployed position.
Figure 14:
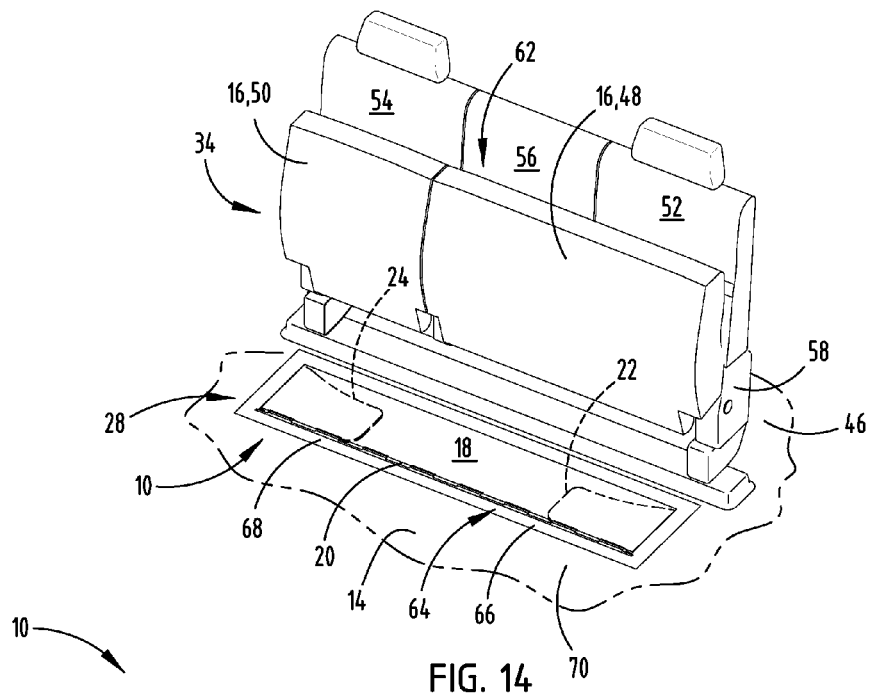
FIG. 14 is a top perspective view of the seating assembly and underseat storage assembly in the stored position.
Figure 14A:
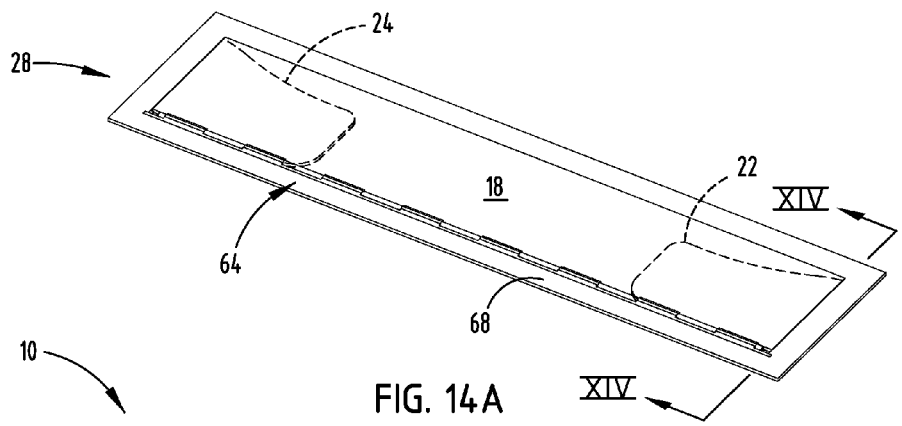
FIG. 14A is a top perspective view of the underseat storage assembly, as shown in FIG. 14.
Figure 14B:
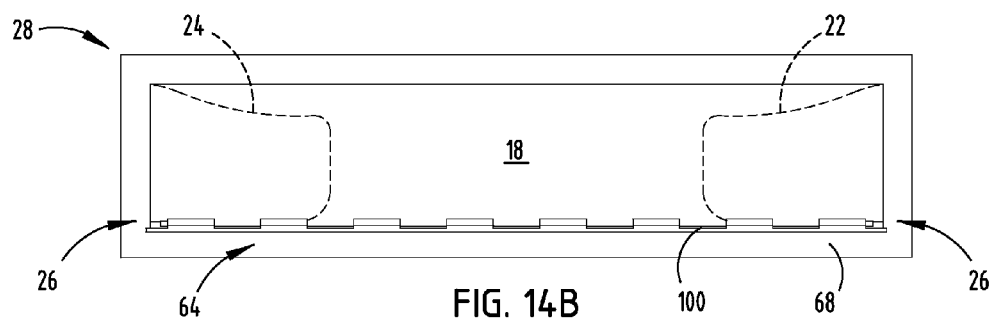
FIG. 14B is a top plan view of the underseat storage assembly, as shown in FIG. 14.
Figure 14C:
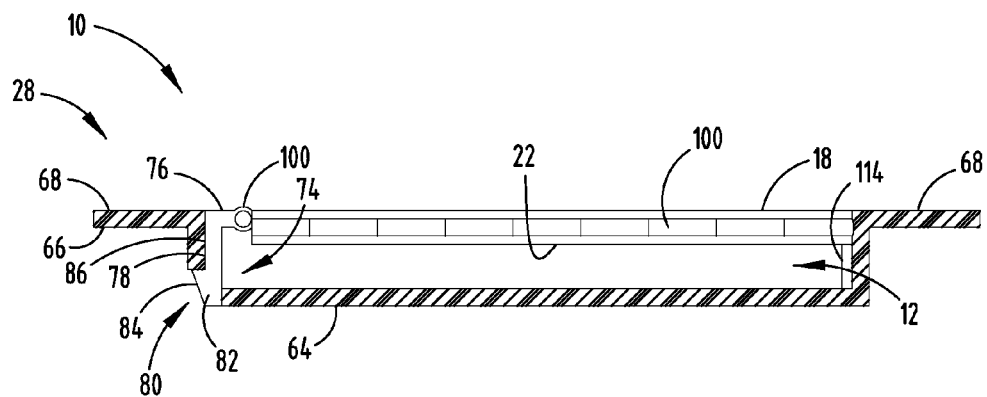
FIG. 14C is a cross-sectional side view of the underseat storage assembly, taken at line XIV-XIV of FIG. 14A.

With reference to FIGS. 5-7, the front panel 18, the base member 64, and the first and second side panels 22, 24 are shown assembled and arranged in the deployed position 30. As such, the front panel 18 is in substantially vertical alignment and is generally orthogonal relative to the planar peripheral surface 68 of the base member 64. Likewise, the first and second side panels 22, 24 are generally orthogonal relative to both the peripheral surface of the base member 64 and the front panel 18, placing the first and second side panels 22, 24 in a similar substantially vertical alignment. A central portion of the base member 64 is inset downward to define the recess 12 in the floor 14. The recess 12 includes a bottom surface 72 that is generally parallel to the planar peripheral surface 68 of the base member 64 but is inset downward a short distance sized to receive the thickness of at least the front panel 18 and the first and second side panels 22, 24 in the collapsed stored position 28 (FIG. 14C).

As also shown in FIGS. 5-7, the bottom edge 20 of the front panel 18 pivotally couples along a front portion 74 of the recess 12. More specifically, the bottom edge 20 of the front panel 18 is hingedly coupled with a top edge 76 of an attachment feature 78 that extends laterally and downward to engage a gap 80 that extends along a forward portion of the bottom surface 72 of the recess 12. A bottom edge of the attachment feature 78 has a clip element 82 with an angled upright surface 84 that transitions to a generally horizontal retention surface 86, whereby the clip element 82 is frictionally retained in the gap 80 by the retention surface 86 abutting an upper portion of the gap 80. The attachment feature 78 extends laterally slightly beyond the lateral edges 88 of the recess 12 within a slot to provide additional stability to the attachment feature 78 and the front panel 18. It is contemplated that the attachment feature 78 and the gap 80 may be segmented along the length of the recess 12.

With further reference to FIGS. 5-7, the first and second side panels 22, 24 in the deployed position 30 extend rearward from the front panel 18 beyond the peripheral surface 68 of the base member 64, bordering the lateral edges 88 of the recess 12. In addition, the first and second side panels 22, 24 have a top edge 90 that angles downward from the front panel 18 with a concave curvature. A front edge 92 of the first and second side panels 22, 24 is generally vertical and in parallel alignment with a rear edge 94 that pivotally couples with the front panel 18. The rear corners of the side panels are rounded between the top edge 90 and the rear edge 94 and between the rear edge 94 and a bottom edge 96 that is generally orthogonal to the front edge 92. The bottom edge 96 extends continuously along the lateral edges 88 of the recess 12 to provide a barrier between the recess 12 and the planar peripheral surface 68 of the base member 64. It is conceivable that the side panels 22, 24 may have an alternative shape that still provides a lateral barrier to the storage volume 32. Also, the front panel 18 and side panels 22, 24 are constructed of a rigid polymer material, however, it is understood that they may additionally or alternatively include other rigid materials, such as metals, and may have central netted or mesh portions to provide ventilation and to reduce weight of the panels.

Figure 8:
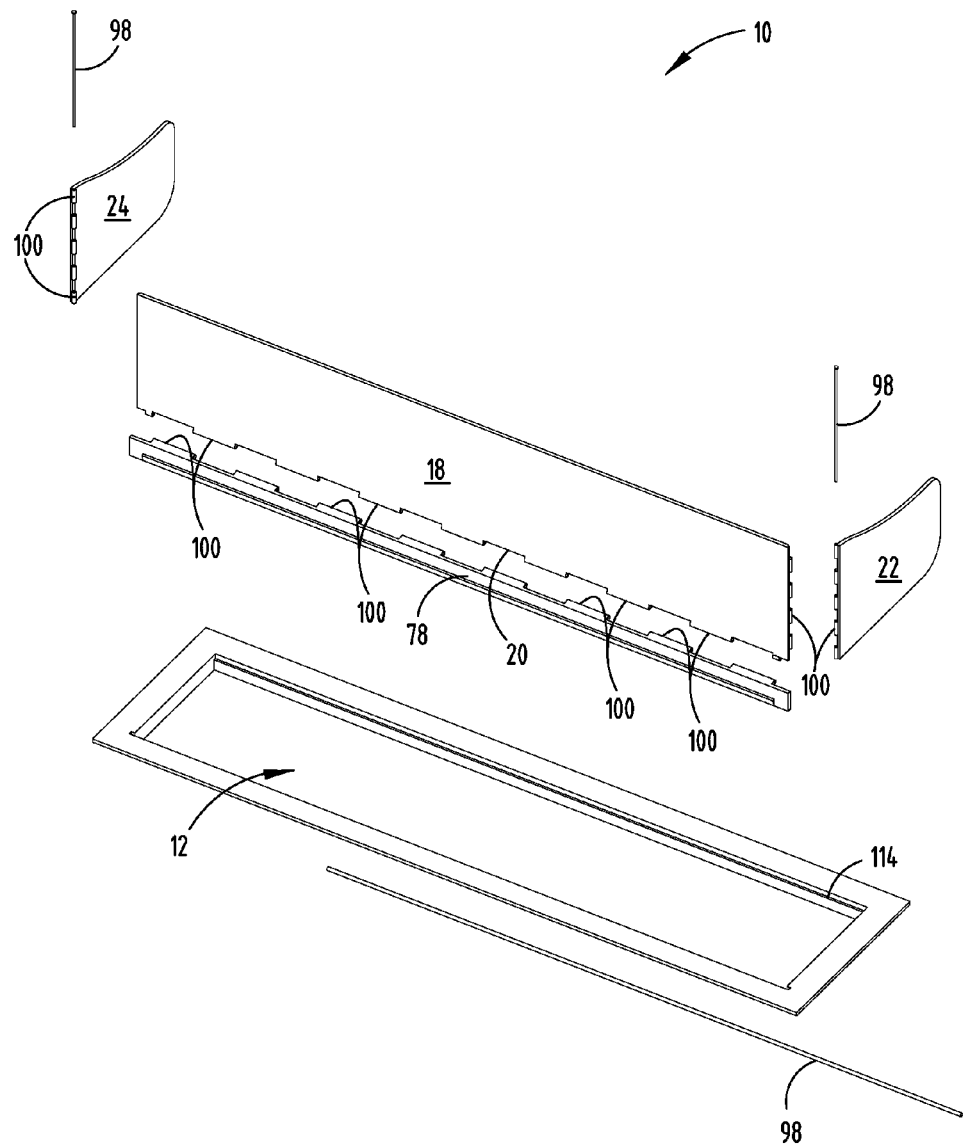
FIG. 8 is an exploded top perspective view of the underseat storage assembly.

As shown in FIGS. 8-9, the pivotal connections between the first and second side panels 22, 24 and the front panel 18 as well as between the front panel 18 and the attachment feature 78 are formed with elongated hinge pins 98 that extend through overlapping hinge joints 100, similar to a door hinge or a piano hinge. The hinge joints 100 are integrally formed on the front panel 18 and the first and second side panels 22, 24. However, it is conceivable that the hinge joints 100 may be separately attached to the panels and further contemplated that the pivotal connections may be a living hinge, a snap-fit hinge joint, or other conceivable pivotal connections, as generally understood by one having ordinary skill in the art. The pivotal connection between the front panel 18 and the attachment feature 78 is configured so the front panel 18 may only pivot between the vertical orientation (FIG. 5) and pivot forward to a generally horizontal collapsed position (FIG. 14). Similarly, the pivotal connection between the first and second side panels 22, 24 and the front panel 18 prevent the first and second side panels 22, 24 from pivoting outward beyond the planar peripheral surface 68 of the base member 64. However, it is contemplated that other configurations, such as end stops, may be employed with alternative pivotal connections to prevent the front panel 18 and the first and second side panels 22, 24 from pivoting beyond desired positions.

As illustrated in FIGS. 10-11, the attachment feature 78 has a body portion 102 with a substantially L-shaped cross-section. The top edge 76 of the attachment feature 78 is configured to pivotally attach with the bottom edge 20 of the front panel 18 and the bottom edge configured with the angled upright surface 84 and retention surface 86 to removably engage the front portion 74 of the base member 64. The retention surface 86 of the attachment feature 78 frictionally engages a downward facing surface 104 of a front wall 106 of the recess 12, whereby the front wall 106 is spaced from the bottom surface 72 of the recess 12 by the gap 80 that receives the attachment feature 78. It is also conceivable that the attachment feature 78 may alternatively engage with the base member 64, such as with fasteners, adhesive, heat welding, or other attachment features generally known by one having ordinary skill in the art. It is also conceivable that the attachment feature 78 may be integrally formed with the base member 64 or another portion of the floor 14 of the vehicle 40.

Figure 12:
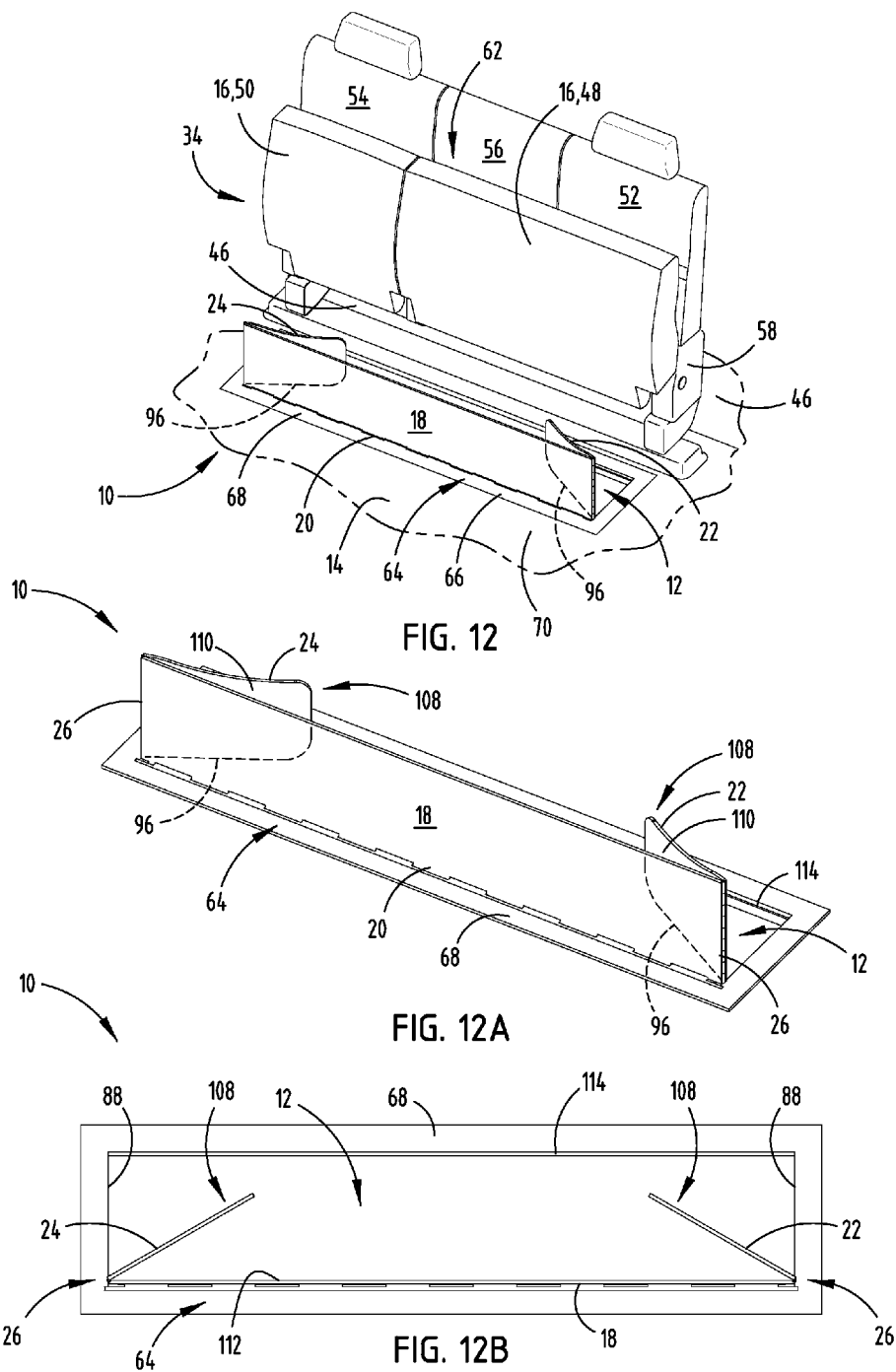
FIG. 12 is a top perspective view of the seating assembly and the underseat storage assembly, having the first and second side panels pivoting inward out of the deployed position.

Referring now to FIGS. 12-12B, to move the underseat storage assembly 10 from the deployed position 30 to the collapsed stored position 28, the first and second side panels 22, 24 are first pivoted inward about the opposing ends 26 of the front panel 18. By pivoting the first and second side panels 22, 24 inward about the front panel 18, the distal ends 108 of the side panels 22, 24 are moved off the peripheral surface 68 of the base member 64, such that the bottom edge 96 of the side panels 22, 24 are taken out of abutting contact with the peripheral surface of the base member 64 and are positioned entirely within the boundary of the recess 12. By rotating the side panels inward away from the rear wall 46, the front panel 18 is allowed to begin pivoting rearward about the bottom edge 20 thereof.

Figure 13:
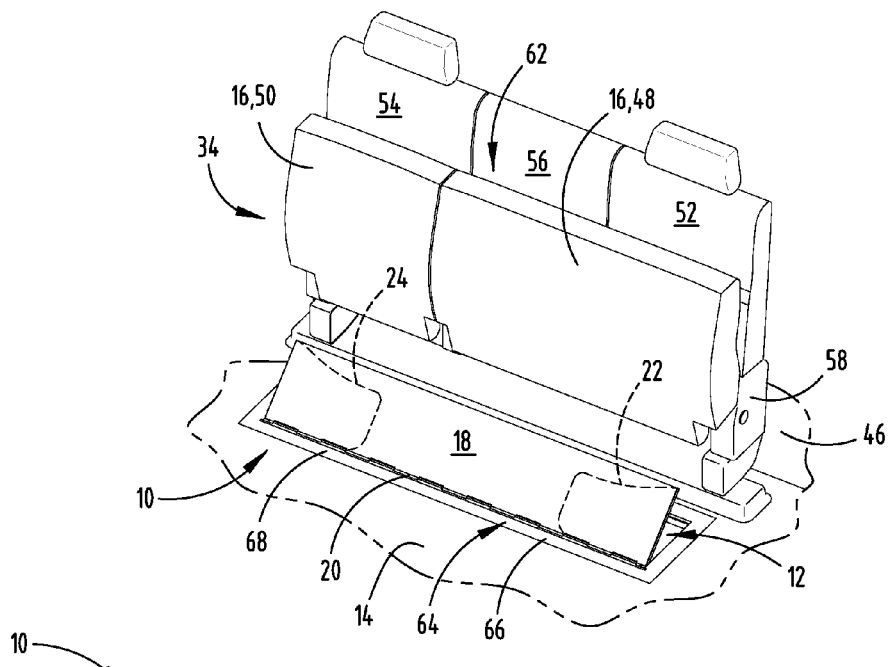
FIG. 13 is a top perspective view of the seating assembly and the underseat storage assembly, having the front panel pivoting rearward toward the stored position.
Figure 13A:
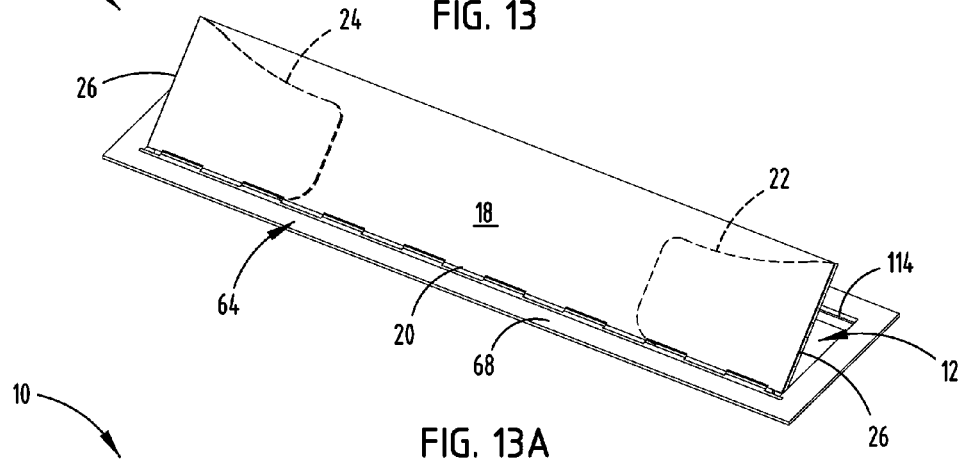
FIG. 13A is a top perspective view of the underseat storage assembly, as shown in FIG. 13.
Figure 13B:
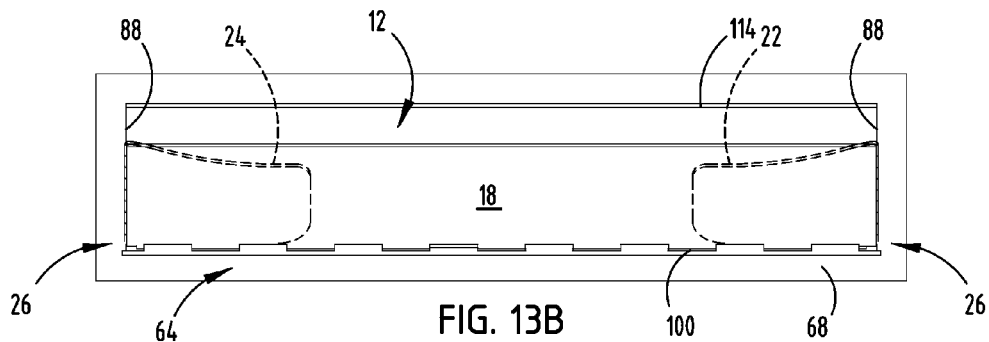
FIG. 13B is a top plan view of the underseat storage assembly, as shown in FIG. 13.

Further transition of the panel assembly from the deployed position 30 to the stored position 28, as further illustrated in FIGS. 13-13B, it is done by pivoting of the first and second side panels 22, 24 further inward to a point where the front panel 18 is permitted to pivot rearward unrestricted from the side panels 22, 24. Upon complete inward rotation of the first and second side panels 22, 24, the inner surfaces 110 (FIG. 12A) of the side panels 22, 24 are placed in abutting contact with the rear surface 112 (FIG. 12B) of the front panel 18, providing a generally parallel alignment with the front panel 18. By moving the first and second side panels 22, 24 into abutting contact with the front panel 18, the front panel 18 is permitted to pivot rearward unrestricted about the pivotal connection between the front panel 18 and the base member 64. The front panel 18 is sized to allow the opposing ends 26 to fit between the lateral edges 88 of the recess 12, such that the first and second side panels 22, 24 pivot inward to a position that is within the lateral edges 88 of the recess 12.

As shown in FIGS. 14-14C, the front panel 18 is fully pivoted rearward to the stored position 28. In the stored position 28, the front surface of the front panel 18 is generally parallel to the planar surface 68 of the peripheral edge 66 of the base member 64 and other portions of the floor 14, including the carpet area 70. To achieve this flush alignment of the front surface of the front panel 18 with the surrounding floor 14, the first and second side panels 22, 24 are contained completely within the recess 12. Further, an outer surface of the first and second side panels 22, 24 abuts a stop 114 that is positioned to extend upward within the recess 12. The stop 114 is sized to align the front surface of the front panel 18 in flush alignment with the peripheral surface 68 of the base member 64 and is configured to absorb any impact of the panel assembly moving to the stored position 28 and to prevent rattles of the panel assembly in the stored position 28 during normal operation of the vehicle 40. The stop 114 may conceivably be altered in shape and location within the recess 12 to provide the mentioned functionality. It is generally understood that the panel assembly may be moved from the stored position 28 to the deployed position 30 by moving the panels in a reverse set of steps from those described in the preceding paragraphs.

Figure 15:
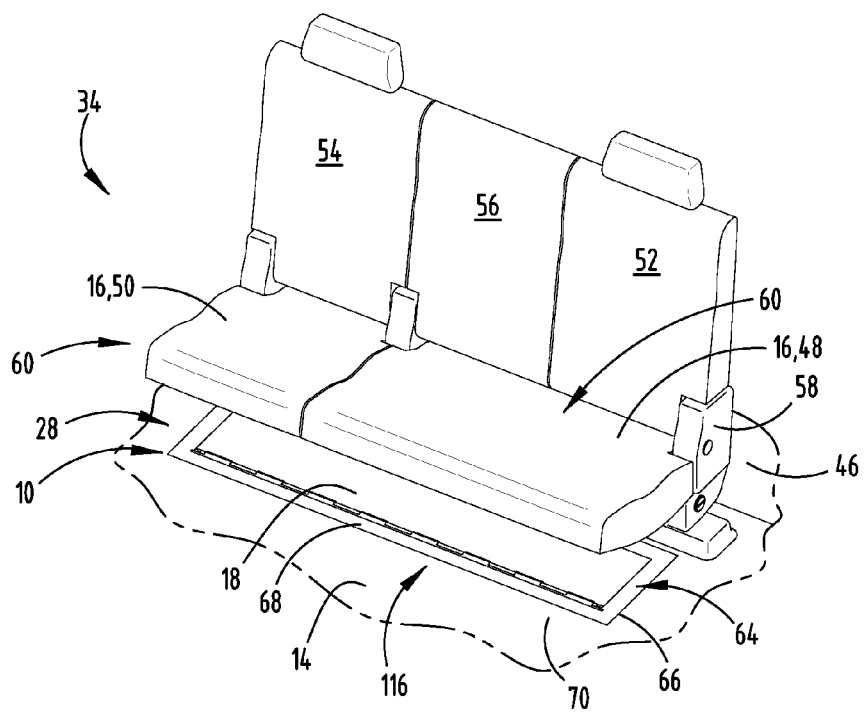
FIG. 15 is a top perspective view of the underseat storage assembly in the stored position, and the seating assembly having the first and second seat in a lowered horizontal position.

As shown in FIG. 15, the first and second seats 48, 50 may also be pivoted downward to the generally horizontal position 60 when the underseat storage assembly 10 is in the stored position 28, providing a consistent floor surface 116 beneath the first and second seats 48, 50. The consistent floor 14 surface is generally defined by the front surface of the front panel 18 being in alignment with planar surface 68 of the peripheral edge 66 of the base member 64 and the carpeted area 70 of the floor 14 surrounding the base member 64. It is understood that the front surface of the front panel 18 may be in parallel alignment with the peripheral surface 68 of the base member 64 and be slightly raised or inset from the peripheral surface 68 to still provide the consistent floor surface 116 beneath the first and second seats 48, 50. It is conceivable that in additional embodiments of the underseat storage assembly 10, the interior storage volume 32 (FIG. 4) may be segmented into separate storage areas by adding more side panels along the length of the front panel 18. It is also conceivable that the additional embodiments of the storage assembly may be configured to have multiple front panels laterally across the vehicle 40 that are separately movable in conjunction with additional side panels to define separately deployable storage volumes, such as a separate storage volume beneath the first and second seats 48, 50. In addition, it is understood that the length of the underseat storage assembly 10 may be shortened, such that the length may be contained beneath a single one of either the first seat 48 or the second seat 50 or may otherwise be configured to have a length that spans outside the seats.

As illustrated in FIGS. 16-17A, one embodiment of a locking feature 118 is shown. The locking feature 118 is configured to move between a locked position 120 holding the seat 16 horizontally over the storage volume 32 and an unlocked position 122 allowing the seat 16 to raise vertically to access the storage volume 32. The specific embodiment illustrated is configured to couple between the front panel 18 and the seat 16 in the horizontal position 60. More specifically, in the illustrated embodiment, the front panel 18 includes a lock plate 124 that pivots on an edge 126 coupled with the front panel 18. The lock plate 124 includes a central aperture 128 that aligns with a loop 130 extending downward from a lower portion of the seat 16, such that the loop 130 extends through the central aperture 128. The loop 130 is configured to receive a padlock 132, as shown in FIGS. 16-16A, that may be attach through the loop 130, placing the locking feature 118 in the locked position 120. Upon attachment of the padlock 132 to the loop 130, the lock plate 124 may not pivot down, thereby preventing the seat 16 from being raised away from the front panel 18. Accordingly, the central aperture 128 of the lock plate 124 is sized so the lock plate 124 may not pivot past the padlock 132 attached to the loop 130. Upon removal of the padlock 132 from the loop 130, as shown in FIGS. 17-17A, the locking feature 118 assumes the unlocked position 122 and the lock plate 124 may pivot down and away from the loop 130 allowing the seat to pivot upward and away from the underseat storage assembly 10 for providing access to the storage volume 32, as previously described. It is understood that the lock plate 124 may alternatively be attached to one of side panels 22, 24 to similarly couple with a loop feature that extends down from a lateral side of the corresponding seat 16.

An additional embodiment of a locking feature 134 is shown in FIGS. 18-19A. In the illustrated additional embodiment, the locking feature 134 is integrated with the riser bracket 58 that pivotally supports the rear wall 46 of the vehicle 40 (FIG. 1). The riser bracket 58 specifically includes a rotatable latch member 136 that pivots about a key barrel 138 to align a notch 140 in the latch member 136 with a retention member 142 that spans along a lower portion of the seat 16. To move the latch member 136 between a locked position 120 (FIGS. 18-18A) and an unlocked position 122 (FIGS. 19-19A), a key may be inserted into a key slot 144 on the key barrel 138 and rotated to move the notch 140 out of engagement with the retention member 142 on the lower portion of the seat 16. With the notch 140 of the latch member 136 out of engagement with the retention member 142, the seat 16 is similarly permitted to pivot upward to provide access to the storage volume 32 of the underseat storage assembly 10. Likewise, in the locked position 120 the latch member 136 prevents the seat 16 from pivoting upward out of the generally horizontal position 60 that conceals the storage volume 32 (FIG. 4) of the underseat storage assembly 10. It is understood that the additional embodiments of the locking feature is conceivable from those illustrated and described herein.

It will also be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

We claim:

1. An underseat storage assembly for a vehicle seat, comprising:
    a recess disposed on a floor below the vehicle seat;
    a front panel having an edge pivotally coupled with the floor; and
    first and second side panels pivotally coupled about a first and second axis at opposing ends of the front panel, the front panel movable between a stored position within the recess and a deployed position having the first and second side panels vertically arranged and orthogonal to the front panel.

2. The underseat storage assembly of claim 1, wherein the edge of the front panel is pivotally coupled with a front portion of the recess.

3. The underseat storage assembly of claim 1, wherein a front surface of the front panel is generally parallel to the floor in the stored position.

4. The underseat storage assembly of claim 1, further comprising:
    a rear wall adjacent to a rear portion of the recess, wherein the front panel is generally parallel to the rear wall in the deployed position.

5. The underseat storage assembly of claim 4, wherein the rear wall, the front panel in the deployed position, and the first and second side panels define a storage volume between the floor and the vehicle seat.

6. The underseat storage assembly of claim 1, wherein the first and second side panels are disposed between the front panel and the floor in the stored position.

7. The underseat storage assembly of claim 1, wherein at least one of the front panel and the first and second side panels are configured to couple with the vehicle seat in the deployed position.

8. An underseat storage assembly for a vehicle, comprising:
    a floor below a seat;
    a recess in the floor;
    a panel assembly pivotably coupled with the floor and comprising:
        a front panel; and
        first and second side panels pivotally coupled with opposing ends of the front panel, the panel assembly is pivotal between a stored position and a deployed position to define a storage volume disposed between the seat and a bottom portion of the recess.

9. The underseat storage assembly of claim 8, wherein a bottom edge of the front panel is pivotally coupled with a front portion of the recess.

10. The underseat storage assembly of claim 8, wherein a front surface of the front panel is generally parallel to and aligned with the floor in the stored position.

11. The underseat storage assembly of claim 8, wherein the first and second side panels are pivoted relative to the front panel to be horizontally disposed between the front panel and a bottom surface of the recess in the stored position.

12. The underseat storage assembly of claim 8, wherein the front panel and the first and second side panels are vertically arranged in the deployed position and horizontally arranged in the stored position, and wherein the first and second side panels are orthogonal to the front panel in the deployed position and parallel with the front panel in the stored position.

13. The underseat storage assembly of claim 8, further comprising:
    a rear wall adjacent to a rear portion of the recess, wherein the front panel is generally parallel to the rear wall in the deployed position.

14. The underseat storage assembly of claim 13, wherein the rear wall, the front panel in the deployed position, and the first and second side panels further define the storage volume between the floor and the seat.

15. The underseat storage assembly of claim 13, wherein the seat is pivotally coupled with the rear wall and pivotal between a horizontal position that conceals the storage volume and an upright position to access the storage volume.

16. The underseat storage assembly of claim 15, wherein at least one of the front panel and the first and second side panels include a locking feature that is configured to couple with the seat in the horizontal position.

17. The underseat storage assembly of claim 8, further comprising:
    a locking feature configured to move between a locked position holding the seat horizontally over the storage volume and an unlocked position allowing the seat to raise vertically to access the storage volume.

18. An vehicular underseat storage assembly, comprising:
    a floor below a seat;
    a recess in the floor;
    a front panel pivotably coupled with the floor and movable between a stored position defining a first storage volume within the recess and a deployed position orthogonal to the floor; and
    first and second side panels pivotally coupled with opposing ends of the front panel and movable orthogonal to the front panel in the deployed position to define a second storage volume defined by the volume of the recess and deployed panels.

19. The vehicular underseat storage assembly of claim 18, further comprising:
    a rear wall extending orthogonal to the floor, wherein the rear wall, the front panel in the deployed position, and the first and second side panels further define the storage volume between the floor and the seat.

20. The vehicular underseat storage assembly of claim 18, wherein at least one of the front panel and the first and second side panels include a locking feature that is configured to couple with the seat in the deployed position.

* * * * *